Mar. 27, 1923.
C. A. BODDIE.
FURNACE REGULATOR SYSTEM.
FILED JUNE 25, 1919.
1,449,880.
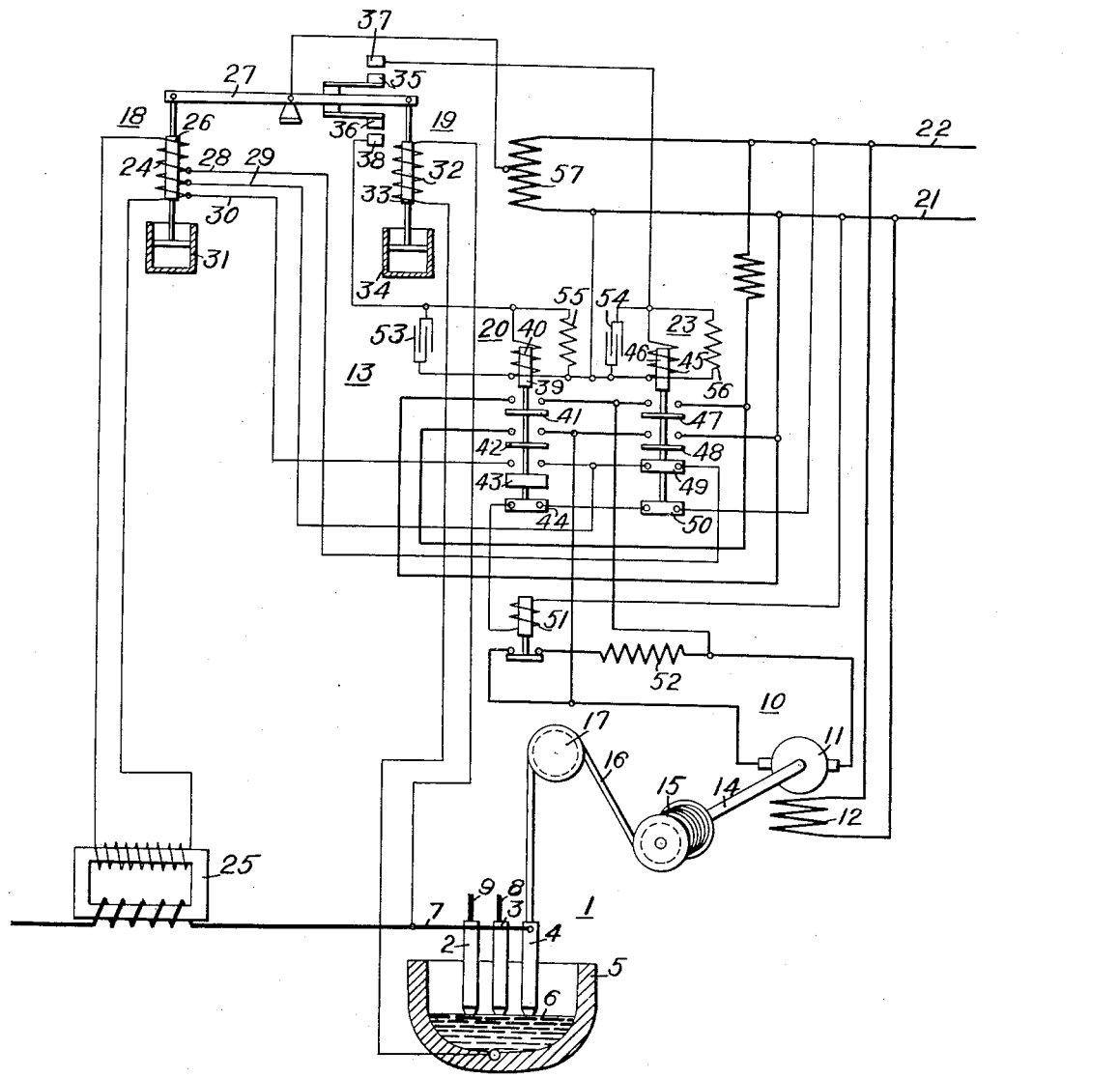
WITNESSES:
J. A. Helsel
W. B. Wells.
INVENTOR
Clarence A. Boddie.
BY
Wesley G. Carr
ATTORNEY Patented Mar. 27, 1923.

1,449,880

UNITED STATES PATENT OFFICE.

CLARENCE A. BODDIE, OF PITTSBURGH, PENNSYLVANIA, ASSIGNOR TO WESTING-HOUSE ELECTRIC & MANUFACTURING COMPANY, A CORPORATION OF PENNSYLVANIA.

FURNACE-REGULATOR SYSTEM.

Application filed June 25, 1919. Serial No. 306,723.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Furnace-Regulator Systems, of which the following is a specification.

My invention relates to regulator systems and particularly to regulator systems for governing the operation of the movable electrodes in electric furnaces.

One object of my invention is to provide a furnace-regulator system that shall adjust each movable electrode in accordance with the current and the voltage conditions of the circuit connected to the electrode to maintain a substantially constant arc and be free from hunting action.

Another object of my invention is to provide an electric furnace of the movable-electrode type with a regulator having a current-control electromagnet and a potential electromagnet that shall operate jointly to control an electrode and maintain the arc produced by it substantially constant. Moreover, the regulator is so constructed that the current and the potential electromagnet shall operate separately, in case of failure of the one or the other magnet, to maintain an approximately constant arc between the electrode and the bath of material being treated.

In operating a furnace of the movable-electrode type, it is customary to raise and to lower each electrode by means of an electric motor and to so control the motor in accordance with the current flowing through the associated electrode as to maintain a substantially constant arc between the electrode and the bath of material being treated. However, regulation of an electrode solely in accordance with the current supplied to it, is unsatisfactory, in some cases, inasmuch as no account is taken of the potential across the arc or of the power taken by the arc and, in case of a large wattless current flowing through any electrode, the heating effects produced by the various electrodes are subjected to considerable variation. In such case, the different parts of the bath are heated to different temperatures so as to impair the quality of the material being treated, and the furnace is liable to deteriorate at a much greater rate than if subjected to equal heating effects by the various electrodes.

In a regulator system constructed in accordance with my invention, each motor which controls the raising and the lowering of an electrode is governed by a regulator having a current and a potential electromagnet. The current electromagnet is energized directly in accordance with the current flowing through the electrode and operates the associated motor to raise and to lower its electrode in a manner to maintain the current flow substantially constant. The potential electromagnet is connected across the arc produced by the electrode and serves to govern the motor in accordance with such potential. Thus, each electrode in the furnace is not only controlled in accordance with the current flowing through it but also in accordance with the potential across the arc produced by it and, accordingly, variations in the heating effects produced by the various electrodes are prevented. The energization of the current electromagnet is varied in accordance with the operation of the motor in order to prevent hunting action by the regulator.

In a regulator system constructed in accordance with my invention, the motor associated with each electrode may not only be controlled jointly by the current and the potential electromagnet but may be controlled separately by either of such electromagnets. In the latter case, however, unequal heating effects are liable to be produced by the various electrodes and, accordingly, such operation should not be maintained for any great length of time.

The single figure of the accompanying drawing is a diagrammatic illustration of a regulator system embodying my invention.

Referring to the drawing, an electric furnace 1, comprising three movable electrodes 2, 3 and 4, and a receptacle 5 containing the material 6, which is being treated, is directly connected to a three-phase supply circuit comprising conductors 7, 8 and 9.

Each of the movable electrodes 2, 3 and 4 is provided with a motor and a regulator system for governing the motor not only in accordance with the current flowing through the electrode but also in accordance with the potential across the arc produced by it and, inasmuch as the regulator systems associated with the electrodes are similar in design and operation, it is deemed sufficient to describe and illustrate but one regulator system, namely, the one which is associated with the movable electrode 4.

A motor 10, comprising an armature 11 and a field winding 12, is governed by a regulator 13 to so raise and lower the electrode 4 as to maintain a substantially constant arc between the electrode and the bath of material 6. The motor 10 is connected to the electrode 4 in any suitable manner, as by means of a shaft 14, a winding drum 15 and a flexible connector 16, which passes over a pulley 17 and is directly connected to the electrode 4.

The regulator 13 comprises a current electromagnet 18, which is energized in accordance with the current supplied to the electrode 4, a potential electromagnet 19, which is energized in accordance with the potential across the arc produced by the electrode 4, a switch 20, which connects the motor 10 across the auxiliary supply conductors 21 and 22 for operating the motor in a counter-clockwise direction, and a switch 23 which serves to connect the motor across the supply conductors 21 and 22 to operate it in a clockwise direction.

The electromagnet 18 comprises a winding 24, which is directly connected to the three-phase supply conductor 7 by means of a current transformer 25, and a core armature 26 which is pivotally connected to a contact arm 27. The winding 24 is provided with three taps 28, 29 and 30, for a purpose to be hereinafter set forth, and the core armature 26 is provided with a dash-pot 31 for governing its operation.

The electromagnet 19 comprises a winding 32, which is connected across the arc produced by the electrode 4, and a core armature 33 which is connected to the contact arm 27 near the end opposite to the connection of the core armature 26. The core armature 33 is provided with a dash-pot 34 for adjusting its speed of operation.

The contact arm 26 is pivotally mounted intermediate the points of connection of the core armatures 26 and 33 and is provided with two main contact members 35 and 36 which are disposed adjacent to the point of connection of the core armature 33. The contact member 35 engages a contact member 37 in one position of the contact arm 27 and, in the opposite position of the contact arm, the contact member 36 engages a contact member 38.

The switch 20 comprises a winding 39, which is connected across the supply conductors 21 and 22 upon engagement of the contact members 36 and 38, and a core armature 40. The core armature 40 controls the operation of two switch members 41 and 42 and two interlock-switch members 43 and 44. The switch members 41 and 42 connect the motor armature 11 across the supply conductors 21 and 22 when it is desired to rotate the motor in a counter-clockwise direction and effect the raising of the electrode 4 from the bath of material 6. The interlock-switch member 43 serves, upon operation of the switch 20, to short-circuit that portion of the winding 24 of the main electromagnet 18 that is included between the taps 29 and 30. Such portion of the winding 24 is short-circuited by the interlock-switch member 43 in order to change the setting of the regulator upon operation of the switch 20 to prevent hunting action.

The switch 23 comprises a winding 45, which is connected across the supply conductors 21 and 22, upon engagement of the contact members 35 and 37, and a core armature 46 which controls the operation of two main switch members 47 and 48 and two interlock-switch members 49 and 50. The switch members 47 and 48 connect the armature 11 across the supply conductors 21 and 22 for operating the motor 10 in a clockwise direction to effect a lowering of the electrode 4 into the bath of material 6. The interlock-switch member 49 serves, upon operation of the switch 23, to open the short-circuit normally existing across that portion of the winding 24 which is included between the taps 28 and 29. The interlock-switch member 49 changes the setting of the regulator in order to prevent hunting action by it.

The two interlock-switch members 44 and 50, upon release of the two switches 20 and 23, connect a relay 51 across the supply conductors 21 and 22. The relay 51, when operated, serves to complete a dynamic-braking circuit for the motor 10 through a resistor 52. The field winding 12 of the armature 10 is directly connected across the supply conductors 21 and 22.

The condensers 53 and 54 and the resistors 55 and 56, which are associated with the windings of the switches 20 and 23, are provided for improving the operation of the main contact members 36 and 38 and 35 and 37. The contact arm 27 is connected to the supply conductors 21 and 22 through a resistor 57.

In case of a reduction in the current flow through the electrode 4 or of an increase in the potential across the arc produced by the electrode 4, either the electromagnet 18 or the electromagnet 19 is operated to effect engagement of the main contact members 35 and 37. Usually, the two electromagnets 18 and 19 will operate jointly to effect engagement of the contact members 35 and 37 or the contact members 36 and 38 but it is to be understood that, under certain conditions, these magnets may operate severally. Upon engagement of the contact members 35 and 37, a circuit is completed from the supply conductor 22, through a portion of the resistor 57, contact arm 27, contact members 35 and 37, and the coil 45 of the switch 23, to the supply conductor 21. The switch 23 is operated to connect the motor 10 across the supply conductors 21 and 22, and the motor is operated, in a clockwise direction, to effect a lowering of the electrode 4 into the bath of material 6. The lowering of the electrode 4 increases the current flow through it and decreases the potential across the arc produced by it.

Upon operation of the switch 23, the interlock-switch member 49 opens the short-circuit normally existing across the taps 28 and 29 of the winding 24 in order to increase the energization of the electromagnet 18 and return the contact arm 27 to a normal position just prior to the obtaining of normal current flow through the electrode and normal voltage across the arc produced by the electrode. If the motor 10 were controlled solely by the effect upon the main control magnets 18 and 19 of the current flowing through the electrode 4 and the potential across the arc produced by the electrode 4, the contact arm 27 would not be moved to separate the contact members 35 and 37 until normal conditions obtained in the circuit connected to the electrode 4. Consequently, by reason of the inertia of the various moving parts of the regulator, it is seen that the motor 10 would overtravel to lower the electrode 4 beyond the desired point and, accordingly, increase the current flow through it above normal value. In order to prevent such operation, the interlock switch member 49 increases the energization of the electromagnet 18 and thus effects the separation of the contact members 35 and 37 and the de-energization of the motor 10 just prior to the obtaining of normal electrical conditions in the circuit connected to the electrode 4.

In case of an increased current flow through the electrode 4, the energization of the electromagnet 18 is increased to operate the contact arm 27 and thus to effect engagement between the contact members 36 and 38. Similarly, a reduction in the voltage across the arc produced by the electrode 4 will reduce the energization of the electromagnet 19 to effect engagement of the contact members 36 and 38.

Upon engagement of the contact members 36 and 38, a circuit is completed through the energizing coil 39 of the switch 20 which extends from the supply conductor 22, through a portion of the resistor 57, contact arm 27, contact members 36 and 38, and the winding 39 to the supply conductor 21. Thereupon, switch members 41 and 42 complete a circuit for operating the motor 10 in a counter-clockwise direction to effect a raising of the electrode 4 from the bath of material 6.

Simultaneously with the operation of the motor 10 by the switch members 41 and 42, the interlock-switch member 43 short-circuits that portion of the winding 24 of the main electromagnet 18 which is included between the taps 29 and 30. Consequently, the setting of the electromagnet 18 is changed and, just prior to the obtaining of normal current flow through the electrode 4, the contact arm 27 is operated to separate the contact members 36 and 38, and de-energize the motor 10.

In case the motor 10 is operating in a clockwise or in a counter-clockwise direction, the release of the switch 23 or the switch 20 operates the relay 51 by means of the interlock-switch members 44 and 50. The relay 51, in turn, completes a dynamic-braking circuit through the motor armature 11 to effect quick stopping of the motor.

Modifications in the system and arrangement and location of parts may be made within the spirit and scope of my invention, and such modifications are intended to be covered by the appended claims.

I claim as my invention:

1. In a regulator system, the combination with a movable electrode, and a motor for raising and lowering the electrode, of a regulator for governing the operation of the motor, means for operating said regulator in accordance with the current flowing through the electrode and in accordance with the voltage across the arc produced by the electrode, and means for preventing hunting action by the regulator.

2. In a regulator system, the combination with a movable electrode and a motor raising and lowering the electrode, of a regulator for governing the operation of said motor and comprising a current winding energized in accordance with the current flowing through the electrode and a potential winding energized in accordance with the voltage across the arc produced by the electrode, and means for varying the active portion of said current winding to prevent hunting action by the regulator.

3. In a regulator system, the combination with an electric furnace having a movable electrode, and a motor for raising and lowering said electrode, of regulating means for controlling said motor and comprising an electromagnet operated in accordance with the current passing through the electrode and a second electromagnet operated in accordance with the voltage obtaining across the arc produced by the electrode, and means for varying the energization of one of said electromagnets to prevent hunting action by the regulator.

4. In a regulator system, the combination with an electric furnace having a movable electrode, and a motor for raising and lowering said electrode, of a regulator for operating said motor in accordance with voltage and current conditions of the furnace, and means for changing the setting of the regulator, upon operation, to prevent hunting action by it.

5. In a regulator system for an electric furnace, the combination comprising, a movable electrode, power means for raising and lowering said electrode, regulating means for said power means and comprising a current electromagnet and a potential electromagnet operated in accordance with furnace conditions, and means for varying said current electromagnet to prevent hunting action by the regulating means.

6. In a regulator system for an electric furnace, the combination with a movable electrode, and power means for raising and lowering the electrode, of means for regulating said power means in accordance with voltage and current conditions of said furnace, and means for preventing hunting action by said regulating means.

7. In a regulator system for an electric furnace, the combination with a movable electrode, and a motor for raising and lowering the electrode, of a regulator for governing the operation of the motor and comprising two electromagnets actuated by different furnace conditions, and means for varying the energization of one of said electromagnets to prevent hunting action by the regulator.

8. In a regulator system for an electric furnace, the combination with a movable electrode, and power means for raising and lowering said electrode, of a regulator for governing the operation of said power means and comprising a plurality of electromagnets operated in accordance with the conditions of the electrode circuit, and means for varying the operation of one of said electromagnets to prevent hunting action by the regulator.

9. In a regulating system for an electric furnace, the combination with a plurality of movable electrodes, and motors for raising and lowering said electrodes, of a regulator for governing the operation of each motor, each of said regulators comprising an electromagnet operated in accordance with the current flowing through the associated electrode and a second electromagnet operated in accordance with the voltage obtaining across the arc produced by the associated electrode, and means associated with each regulator for varying the operation of one of said electromagnets to prevent hunting action by the regulator.

10. In a regulator system, the combination with a supply circuit, a resistance-varying member in said circuit and a motor for operating said member, of a regulator for operating said motor in accordance with the voltage and current conditions of the supply circuit and means for changing the setting of the regulator upon operation to prevent hunting action by it.

11. In a regulator system, the combination with a supply circuit, means for varying the resistance in said circuit, of a regulator for governing said resistance-varying means, means for operating said regulator in accordance with the current and the voltage conditions of the supply circuit and means for preventing hunting action by the regulator.

12. In a furnace-regulator system, the combination comprising a movable electrode, means comprising a regulator for governing the operation of said electrode to maintain a constant electrode arc, said regulator comprising a current and a potential winding energized from the electrode circuit, and means for varying the energization of one of said windings to prevent hunting action.

In testimony whereof, I have hereunto subscribed my name this 20th day of June, 1919.

CLARENCE A. BODDIE.